INVENTOR.
RAYMOND A. HEISLER
BY
Ralph R. Roberts
AGENT

March 4, 1969  R. A. HEISLER  3,430,410
METHOD FOR MAKING EARED TAPERED CONTAINERS
Filed Nov. 21, 1966  Sheet 2 of 3
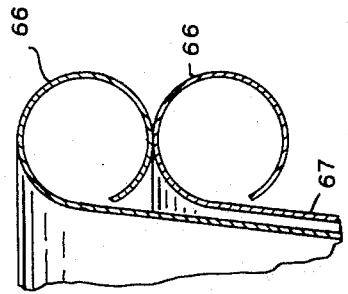
Fig. 7
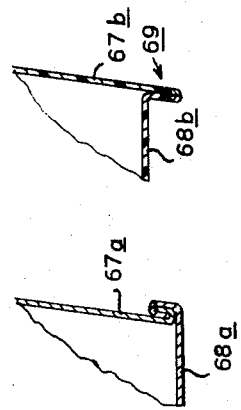
Fig. 6
Fig. 5
Fig. 4
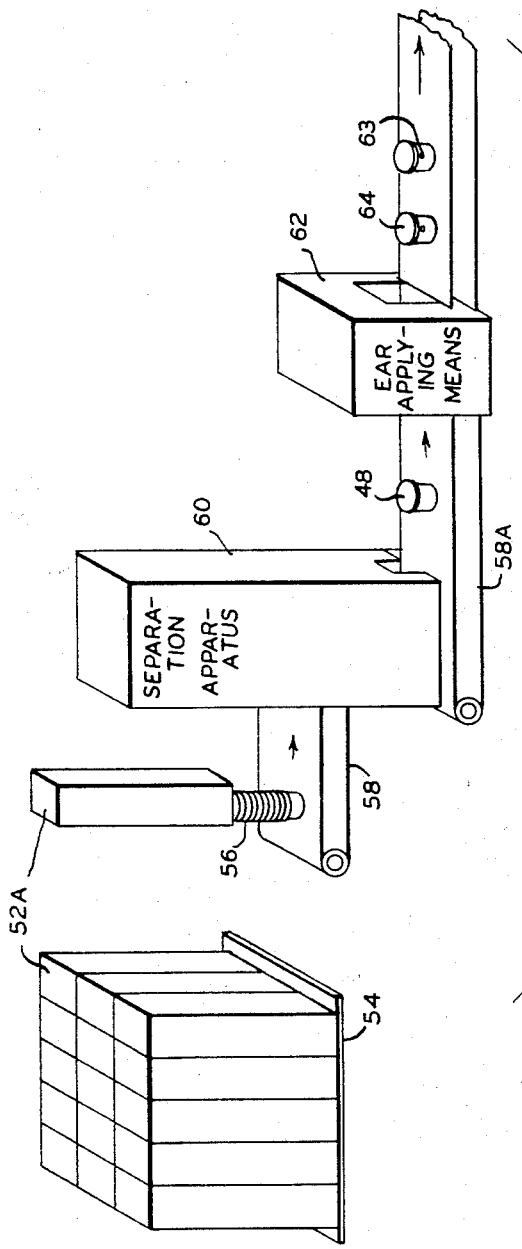
Fig. 2
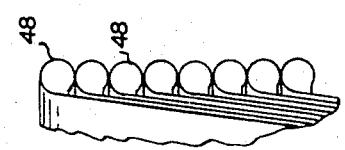
Fig. 3
INVENTOR.
RAYMOND A. HEISLER
BY
Raeph R. Roberts
AGENT

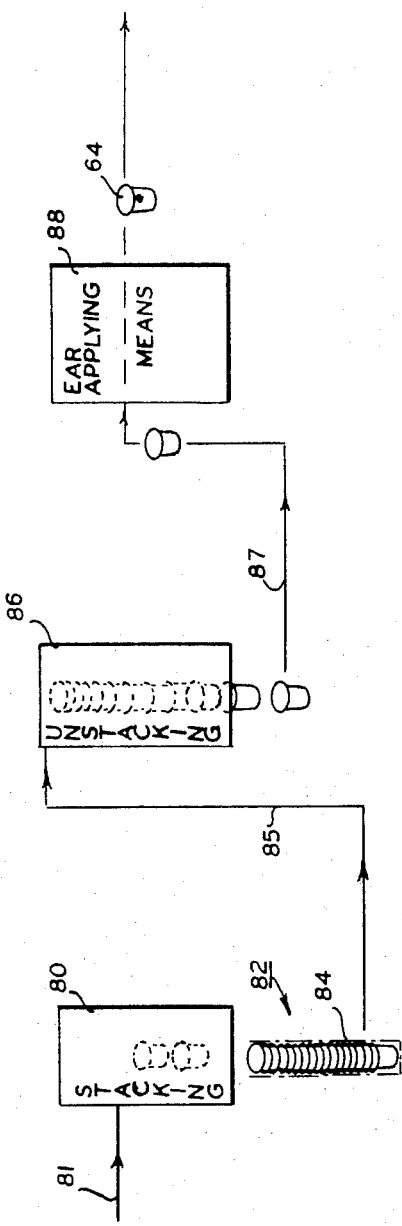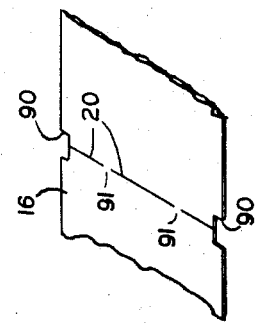

United States Patent Office 3,430,410
Patented Mar. 4, 1969

3,430,410
**METHOD FOR MAKING EARED
TAPERED CONTAINERS**
Raymond A. Heisler, 657 Dakota Trail,
Franklin Lakes, N.J. 07417
Filed Nov. 21, 1966, Ser. No. 595,675
U.S. Cl. 53—26                                    3 Claims
Int. Cl. B65b *35/30;* B65h *33/00;* B31b *1/86*

ABSTRACT OF THE DISCLOSURE

In a method of forming tapered containers and applying ears thereto, an interrupted sequence in which the containers are completed less their bail ears and at this stage are stacked in a nested array. The containers are then shippable to the container user whence they are separated and one at a time are fed to an ear-applying means.

In the production of the tapered container the side is formed into a tube, the seam is welded except for the end rolling portion, and the tube is then tapered after which the bottom is attached and the top curled into a rolled edge.

BACKGROUND OF THE INVENTION

Field of the invention

The field of this invention relates generally to container making such as is found in the making of metal containers. In particular this invention relates to making a tapered container, stacking the tapered containers in a nested array to require a minimum of storage space, transporting the nested tapered containers to an unloading and separating station and in separated flow feed them to an ear-applying mechanism. A general classification of sheet metal ware making includes more specifically the processes of can making, body forming, and work feeders.

Description of the prior art

Container and can making is a highly sophisticated, high-speed and often complex art. In making tubes and severing them into can bodies the U.S. patent to Knodel, 3,124,872 of Mar. 17, 1964, is a typical example of the art. Other separation means is shown in the U.S. patent to Erlandson, 3,068,345. These and other prior art disclosures contemplate a continuous seam closure after which the seam and tube are separated into cylinders. At this stage the containers are customarily provided with bottoms and top rims.

Tapered containers made from flat stock with at least one side seam, as far as is known, are usually made from shaped blanks adapted for rolling into a tapered configuration. The applying of ears to metal containers is limited to a few disclosures for apparatus for welding ears to cans of which the U.S. patent to Garver, 3,233,072 of Feb. 1, 1966 is an example.

Eared containers are widely known and used as storage and shipping means for paint and the like and are often one, two and five-gallon size. Manufacture of these eared containers is made in many localities in order to reduce the cost of shipping empty containers to the producer of the product to be packaged. Attempts to nest eared containers for shipment while empty have produced, at best, only partially successful results as the ears on the nested containers permit only about three-fourths of the container to be nested in the next container. As shipping is based on weight per specific volume, such a low weight to volume ratio makes the shipping costs quite high. As the use of containers is in the millions of units per year, the volume is such that pennies per unit is a significant amount and must be considered in the cost of the product.

Summary of the invention

This invention relates to a method for making an open-topped container formed in a tapered shape which may then be stacked for shipment whence after shipment the containers are separated and are applied with ears for bails.

More particularly this invention relates to a method for making containers of a tapered shape and adapted to nest within each other, the container being made from a strip and being longitudinally formed into a constant diameter tube thence separated into cylinders of determined length; the tube is then tapered and a bottom is applied after which the container is stacked in a nested pattern; the accumulated containers are then transported, separated and individually are brought in the way of an ear-applying means.

Even more particularly this invention relates to a method for making tapered containers adapted to nest within each other, the container being then nested, transported, separated and then equipped with ears for wire bails; the steps including feeding a strip of material from a reel; die cutting the strip so that it is retained together by a minimum of connecting interstices; when desired, exterior treating the strip; forming the strip into a continuous tube; joining the strip at its seam; separating the tube into determined portions; tapering each section; attaching a bottom to the tapered section; stacking the tapered containers in a nested array; transporting the nested array to a packaging complex; separating the containers; and attaching ears to the tapered containers.

It is, therefore, an object of this invention to provide a tapered container with an open top and each adapted to be nested within another so as to provide an efficient stacking to provide a high-weight-to-volume ratio. The containers so stacked have their bail ears attached to their sides after transport and separation.

It is a further object of this invention to provide a method of economically making a container with a rolled-edged open larger end and a tapered wall adapted for near contiguous nesting of one container within the next whereupon the containers can be shipped to the container user whence the containers are separated, bail ears applied and the container filled.

It is a still further object of the invention to provide a method of providing a container made as a continuous tube with its longitudinal edges securely bonded as by welding, soldering, etc., the tube then being separated into tubular lengths, the tube then being tapered, a safe edge formed on the larger end and adapted for engagement by a cover and the other end provided with a bottom; the containers are then nested and shipped to the processor who separates the containers and applies bail ears.

It is a further object of this invention to provide a method of economically making a container with an outwardly rolled edge on a larger open end and a tapered wall adapted for near contiguous nesting of the wall of the container with the next container and in this nested condition the containers are shipped to a use position whence the containers are separated and by a conveying means are transported to a bail ear-applying means.

It is an object of this invention to provide a method in which stacked containers have a high-weight-to-volume ratio and in stacked array are shipped to the packaging customer who, when desirous of use, separates the containers and then attaches bail ears to the sides of the containers. The nesting of the containers in a stack as they are shipped and then separated after transport utilizes most efficiently the most of the space necessary provided for the transport of the containers. As reduced to practice the nesting of containers as above-described normally permits twenty times or more containers to be shipped than is customary in the shipment of straight-sided eared containers.

*Brief description of the drawings*

In order to facilitate understanding of the present invention, reference will now be made to the appended drawings of a method of making a preferred specific embodiment and two alternate constructions of the present invention. Such drawings should not be construed as limiting the invention which is set forth in the appended claims.

In the drawings:

FIG. 2 represents a flow diagram in which a stacked array of tapered containers are unloaded from a pallet and are passed through a separating process and ear-applying mechanism;

FIG. 3 represents a fragmentary sectional view showing the containers stacked in a nested array for shipping;

FIG. 4 represents a fragmentary sectional view of a bottom assembly of one embodiment of a tapered container;

FIG. 5 represents a fragmentary sectional view showing an alternate construction of assembling a bottom to a tapered side of a container;

FIG. 6 represents a fragmentary sectional view showing an alternate construction of assembling a bottom to the tapered side when the bottom and side are made of plastic;

FIG. 7 represents a sectional view in a greatly enlarged scale and showing the nesting of two adjacent tapered containers;

FIG. 8 represents a flow diagram for the loading of a series of tapered containers into a nested condition one within the other and in a nested array transporting the containers to a use location thence feeding the nested containers to a separating mechanism for the separation of these containers from the stack and then passing the container in a separated array through an ear-applying mechanism, and FIG. 9 represents an isometric view showing a portion of a strip and the die cutting near separation of said strip.

*Description of the preferred embodiment*

Figure 1:
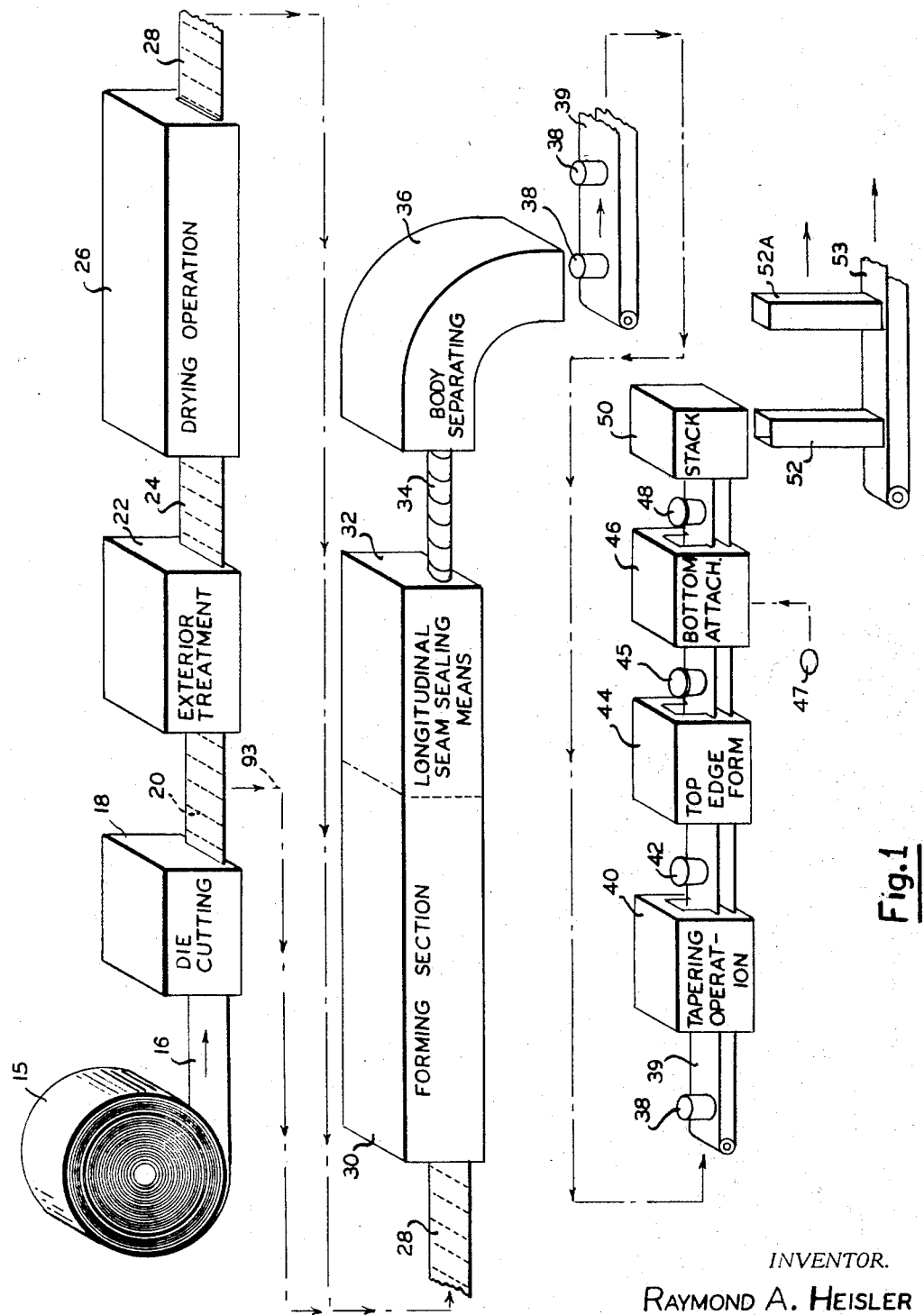
FIG. 1 represents a flow diagram of a method of making tapered containers and nesting the containers in a stacked array.

Referring now to the drawings in which like numerals refer to the same parts, FIG. 1 shows in a somewhat diagrammatic outline the steps of making a tapered container and stacking these containers one within the other to form a nested array in which the containers are shipped while occupying a minimum of space. In the preferred method shown, a coil 15 is preferably of tin plate or plastic and is mounted or supported by an unreeling device not shown. From this coil 15 a strip 16 is caused to be moved into a die cutting apparatus 18 which cuts or separates substantial portions of the advancing strip. Alternatively the die may be adapted to emboss the strip so that a minor force application transversely of this strip will cause the strip to be separated at a later point in this operation. Particularly as seen in FIGS. 1 and 9 a die cut identified as 20 extends completely across the width of the strip with only small solid interstices interrupting the completeness of the cut whereby the strip is retained together for alignment and further transport.

When the container made from this strip is to have a decorated exterior such as is achieved by painting or affixing of a decal and the like, the next step in the operation includes the step of exterior treating of the strip which includes spray painting, applying of paint by rolls and the like, after which the strip now designated 24 is advanced into a drying operation 26. The drying operation 26 is shown in a preferable form of a heated oven but an equivalent other device such as radiation and the like may be used. This decorated strip, now identified 28, is now advanced into a forming operation in a forming section 30. In this section the strip is caused to be rolled into a tube with its longitudinal edges brought over one another after which said edges are seam welded or soldered to form a completed tube. In this longitudinal seam welding section 32, when the tube is to be lap welded, an interior electrode and support is made a part of the forming section and an external rolling electrode is adapted to be brought down upon the edges to be joined and in this manner the seam of the tube is preferably joined. When the method of assembly is soldering, the edges of the tube are soldered by passing the edges through conventional soldering operations. When the strip is plastic and the resulting tube is of a type of plastic amenable for joining by heat sealing, the seam is joined by heated rolls or pressure strips.

The strip now formed into a tube 34, and with its edges joined and sealed, is now separated into tubular sections in a separating station 36. With the exception of the two or three small interstices, the separation at prior cut 20 is complete. It is necessary, therefore, to make a separation of only the interstices which is preferably done by bending of the tube in a curved guideway in station 36. This bending is intended to stretch the interstices beyond their elastic limit to provide separation of these interstice portions. This tube in this manner is readily separated into determined lengths at die cuts 20, and after separation are identified as tube portions 38.

It is also contemplated that separation can be accomplished without bending if saws are arranged to be advanced into the tube to cut the interstices. As the length of the interstice is contemplated to be about one-sixteenth of an inch and the material thickness of the metal to be only a few thousandths of an inch, the saw can be a thin abrasive disk rotated at high speed and swing on an arm and when advanced into the interstice to sever the interstice. Equivalent cutting means may, of course, be used. From separation these tube portions are transported as on a belt conveyor 39, upon which conveyor they are advanced to a tapering operation indicated as station 40. In this tapering operation the tube portion 38 is caused to be expanded from one end with the walls converging at a preferred rate of two to four degrees. The tapering at this station is contemplated as being done in a female die and male horn or plug. As the tube separation contemplates the determined orientation of the tube portions 38 upon the conveyor 39, the oriented portions are fed into a determined position in the female die. A male plug or die having a clamp portion therein is adapted to move into the interior of the tube and clamp the seam of the tube against the outer female die. A tapering portion then moves into the interior of the tube portion and stretches the unclamped tube portion to form the desired taper. In the case of a thermoplastic tube, heat is applied to permit the tube wall flow or stretch and cooling is applied to set the wall.

After the tapering operation is completed the tapered cylinder 42 is released from the operation and is advanced to a top rolling or forming station 44 in which the larger end of the tube is caused to be rolled outwardly and over in the manner seen in FIG. 7. Other edges of a similar type of formation may be made upon the top to make a safe edge adapted to provide an engagement means for a cover or lid to be applied. This tapered cylinder now identified as 45 is advanced to a bottom attaching station 46. A bottom for the container is attached in one of several conventional ways to produce assemblies shown in FIGS. 4, 5 and 6 and to be hereinafter described.

This container now completed as to sides and bottom is identified as 48 and is now advanced into a stacking means identified as 50 in which the containers 48 are oriented and in a nested array are preferably fed into a carton 52, said carton holding the containers in actual alignment so that their sides are contiguous and occupy the minimum amount of space. The containers are assembled as single stacks as indicated or are further assembled in cartons in a multiplicity of stacks, as for example, of three-by-three or three-by-four stacks.

Referring next to FIG. 2 wherein the process includes the further steps of shipping to the product producer the nested containers which are preferably stacked within a single carton which may be sealed and indicated as 52A. Each nested stacked within the containers are shipped, as for example, as a stack of thirty to fifty and when assembled as in FIG. 2, these cartons 52A are customarily transported upon a pallet 54. It is, of course, contemplated that twelve stacks of nested containers, as indicated in FIG. 2, may be within one carton and upon one pallet and when these containers are of metal usually weigh as much as one-thousand to fifteen-hundred pounds.

After its transporting to the producers or packaging area, the nested containers are arranged as a single stack 56 upon a conveyor 58 and by means of this conveyor, successive stacks are fed to a separating means 60 identified as separation apparatus. This apparatus is of a type such that the stacks are fed into a receiving portion preferably having a pair of progressively pitched threaded screws adapted to engage the rolled edges of the container and by means of an increasing pitch of the screws, these containers are separated one by one and are dropped onto another conveying means 58A which may be the same conveyor or which may be a separate conveyor adapted to receive the separated containers 48, and in timed relationship feed these containers to an ear-applying means 62. It is to be noted that this ear-applying means is preferably of a type such as projection welding or is by a soldering operation or the like and where the container 48 is of plastic, a heat sealing method is used for attaching a bail ear 63. Bail ears are preferably mounted in pairs the same distance from the open top of the container and are spaced in a diametrically opposed relationship and which provide an eared container 64 which is fed to further operations such as a bail-applying apparatus not shown.

Referring next to FIG. 3 there is shown containers 48 as nested in stack 56 and spaced so that the top rolled edge of each engage an adjacent container to define the minimum amount of vertical displacement required for each nested container. This is more clearly seen in FIG. 7 in which the container has a rolled edge 66 preferably curled outwardly and around so that the lower portion of said edge engages the upper outer portion of the immediately lower edge of an adjacent supporting container. As thus disposed, the side of the container which is designated as 67 lies adjacent to and theoretically are in disengagement with adjacent containers so that the containers are readily separated without a possibility of a locking engagement of one container to the other. It is contemplated that the rolled edge is a gross diameter of about three-sixteenths of an inch.

Referring next to FIG. 4 there is shown an embodiment in which a bottom 68 is formed with a U-shaped outer rim adapted to receive within the inner portion of the U a bottom end of side 67 and by conventional means the U of the bottom 68 is caused to be sealed as by crimping or other pressure application to attach this bottom edge of side 67 within the U-shape of bottom 68.

Referring next to FIG. 5 it is to be seen that a side wall 67a similar to side wall 67 has its smaller end bent into an outwardly turned U and a bottom 68a similar to bottom 68 is formed with a mating U sized so that the side 67a and the bottom 68a are nested within each other and when crimped form a pressure-resisting and leak-proof joint.

Referring next to FIG. 6 there is shown a further embodiment of a container in which a side wall 67b is made of plastic and a bottom 68b is likewise of plastic. Side and bottom is sealed at 69 by a sealing means such as heat or solvent whereby the container is made leak-proof. The top of this plastic container preferably has an outwardly formed safe edge formed in the manner of the edge of FIGS. 3 and 7 as by heating or may have a folded edge, not shown, also formed by a heating operation. The tapering of a can made of plastic is by distending the can side walls 67b under pressure and in the presence of a warming atmosphere.

Referring now in particular to the method indicated in the steps shown in FIG. 8 it is to be noted that a stacking device 80 is adapted to receive tapered containers such as described above and incoming as indicated at 81 and by guide means not shown accumulate these containers into a nested stack as shown at 82. These nested containers are preferably accumulated in stacks of thirty or more as desired. In a nested condition they are placed in a cartoning device 84 or are accumulated in an array in stacks on a pallet 54 as seen in FIG. 2. From this accumulation the nested containers are transported as indicated by the line 85 to a receiving point which includes an unstacking or separating device 86, which device is adapted to receive one or more nested stacks of containers and one by one separate the containers so as to deposit them on a transporting medium indicated by line 87.

From this transporting means, which may be a conveyor the container is moved to an ear-applying means 88, at which point a pair of diametrically opposed bail ears is attached to each tapered container at a predetermined distance from the upper rolled rim. This container is then transported to further operations which most likely includes the filling and applying of a cover to the container. The transporting of the nested containers from a stacking to an unstacking device contemplates that on most occasions the stacked containers will be moved physically from a can-producing plant to a processing plant. The plant where the containers are unstacked and ears are applied may be many hundreds of miles from the can-producing plant. The physical size for the unstacking device and ear-applying means and the transporting means between the unstacking and ear-applying means is contemplated to use no more than a few square feet of floor space.

Referring finally to FIG. 9 there is shown a fragmentary view of the strip 16 in which the die cutting produces cut portions 20 terminating with edge reliefs 90. Between cuts the strip is retained in alignment and together by interstices 91 acting as small connecting portions until separation is made at station 36. The reliefs 90 are of a determined size and length so that as the strip is rolled into a tube there is a discontinued seam portion provided by the overlapped reliefs 90. This discontinuous seam permits the tube to be held by only two or three interstices 91 which are readily broken or pulled apart at station 36.

OPERATION

The method of this invention contemplates the production of tapered containers at a relatively high speed and continuous manner from the feeding of the strip from the coil 15 until the tapered containers are nested at stacking station 50. In between the reel and nesting it is contemplated that a reciprocating die will provide a strip with successive equally spaced cuts as in FIG. 9. This strip with the edge portions removed as it is rolled into a tube has a discontinuous lapped edge portion which, as it is seamed as by welding, leaves the tube readily separable. After separation, the rolling of the upper edge turns the half edge-relief portion 90 under most of the rolled edge 66 while on the opposite end the U-turned or engaged portion of the bottom is greater than the other half of the edge-relief portion of the side which is covered and sealed at the attachment of the bottom.

It is also to be noted that in certain of its final package operations the container is without a painted or lithographed outer surface. In these circumstances the exterior treating and drying are not used and so strip 20 is either fed through the unused stations or may go directly to the forming operation as indicated by the line 93 in dashed outline in FIG. 1. The step of forming is made by one of several well-known and conventional processes. In the preferred arrangement, shaping rollers are adapted to urge the strip into a round form and over a mandrel (not shown) which is supported to provide a support for rollers and other mechanism used for welding or heat sealing operation to effect the lapping and sealing of the two edges of the container.

The utilizing of a discontinuing seam makes it possible to separate the tubes at station 36 by means of a bending wheel operating in cooperation with an outer retaining support by which means pressure is applied to snap the small interstices 91. As the interstices are snapped the separated portions are advanced to the tapering operation to be stretched into tapered tubes 38 as seen in FIG. 1. This tapering operation indicated as being done by apparatus 40 contemplates, in the case of metal, the use of an expanding die adapted to enter one end and to stretch the walls of the container to form a taper from the bottom extending outwardly to the top in a manner and at a speed sufficient to allow the continuous processing of the containers to be made. The tapered tube is now advanced to the top edge curving or rolling operation whereby dies enter the supported larger end of the tapered tube and curl the edge outwardly, including the exterior portion having no seam. The resulting edge in the rolled configuration is shown in FIG. 7. When the container is made of plastic, the dies for both the tapering and upper end rolling are warmed or heated to a temperature sufficient to cause the plastic tube forming the wall of the container to soften sufficiently for the tapering and rolling of the end to be accomplished.

The attachment of the bottom to the end is made as described in FIGS. 4, 5 and 6 wherein bottoms 47 are fed into an attaching device 46 and by means of crimping or heat sealing join the bottom to the side of the container. The stacking of these containers is contemplated to be done by gravity in that the containers are brought into an aligning device and in this device are released to drop to a nested condition. As the containers fall they are brought in the way of a counting mechanism and onto an accumulating device. In response to the counting of a predetermined number of tapered containers stacked in a carton 52, the carton with the determined number of containers therein is advanced on the conveyor 53. This conveying means is intermittently moved in response to an actuation from the stacker 50.

The operation of unstacking and ear-applying is contemplated to be done within the same plant. This plant is usually a product-producing plant using a container as a means of packaging their product. This plant may be quite distant from the container plant, whereby the transporting step is used to move these containers as piled upon a skid or other accumulating device from one plant to the other. The tapered containers as nested for shipment, occupy a much lesser space than conventional straight-sided containers, as for example, in one-gallon containers thirty-six pails having conventional straight sides are stored in approximately ten and one-half cubic feet of space, whereas in the same ten and one-half cubic feet of space seven hundred and thirty-one tapered containers are nested in stacks. This, of course, as well as saving shipping space, allows a maximum use of storage for the minimum use of space.

The received stacked and nested containers are likely sent to plants having use for the containers for fluid products, as for example, paint and the like. It is, therefore, anticipated that these processing plants will have the flow operation as designated in FIG. 2 in which the stacks of containers are fed to the separation device for single feeding on a conveyor to ear-applying means. Those containers made of metal have metal bail-end receiving ears welded onto the side of the containers, as for example, projection welded ears which are adapted to penetrate the painted or varnished surface and be welded to the metal side. From this ear-applying means the containers are often advanced to bail-applying means and to filling operations. After filling, the container is moved to a cover-applying operation from whence the filled containers are boxed and shipped in a conventional manner to the customer.

The essence of this invention is the method of providing of a container shaped and sized so as to be nested within itself for the accumulation of the most containers in the minimum amount of space. Such nested containers eliminate the "shipping of air" as is the term normally applied to the shipping of straight-sided conventional empty containers as they are transported by truck from the can manufacturer to the processing plant. Determined as follows, either a straight-sided or a tapered container of metal and of conventional thickness weighs approximately one-half pound. As above-described, a ratio of seven hundred thirty-one tapered containers to thirty-six straight-sided containers provides a weight ratio of three hundred sixty-five pounds to eighteen pounds, for a volume of less than eleven cubic feet. Given a truck of normal cubage, the weight of a load of tapered containers is in the neighborhood of several tons while a like truck load of straight-sided containers, at the most, weighs only a few hundred pounds.

Protection by Letters Patent of this invention in all of its aspects as the same are set forth in the appended claims is sought to the broadest extent that the prior art allows.

What is claimed is:

1. The method of making and stacking tapered containers in which the side walls of the containers are made with alike straight tapers adapted to nest within each other absent a locking engagement of the sides, the steps including:
  (a) feeding from a storage reel a strip of sheet metal;
  (b) laterally cutting the material of the strip and in a precise sequenced spacing, the cutting being interrupted so as to leave at least two interstices for the retaining together of the strip for alignment and further transport spacing, said interstices being formed so as to be a determined distance from the longitudinal edges of the strip;
  (c) forming the strip into a longitudinal tube and with the longitudinal edges overlapped;
  (d) advancing the formed tube over a mandrel;
  (e) pressing and joining the lapped longitudinal edges by welding;
  (f) separating into tubular sections the longitudinal tube by bending the longitudinal tube to stretch the interstices beyond their elastic limit;
  (g) tapering the separated tubular section by expanding an inserted expandable male plug to stretch the side wall so as to form a determined taper;
  (h) forming a safe top edge on the larger end of the tapered tubular section by rolling;
  (i) attaching a bottom member to the smaller end of the tapered tubular section;
  (j) advancing into an orienting means the tapered container, and
  (k) stacking in a nested array the tapered containers by inserting the small end of one container into the larger end of a like-sized container.

2. The method of stacking, transporting, unstacking and applying a bail-ear to a tapered container which include the following steps:
  (a) advancing successively from a supply a series of like-sized round tapered containers, each having thin sheet metal side walls and with the larger end having a rounded safe-edge open top;
(b) aligning and stacking in a nested array a plurality of like-sized tapered containers;
(c) packing for transport a plurality of stacks of nested containers;
(d) transporting the packed stacks of containers to a location near the container packaging user;
(e) unpacking the plurality of stacks of containers and advancing the stacks in a spaced sequence into an unstacking apparatus;
(f) arranging each stack of containers with their open ends in an upright condition;
(g) advancing the stack of containers into a separating station wherein a pair of progressively pitched screws is adapted to engage a portion of the outwardly rolled rim of the container;
(h) rotating the screws so that the increase in pitch of the screw separates the adjacent containers so as to allow them to be deposited one-by-one on a transporting means;
(i) transporting and advancing each of a plurality of tapered containers to ear-applying apparatus;
(j) attaching a pair of bail-ears on the sides of each tapered container, the ears of each pair being diametrically opposed and at a determined distance from the open end of the container, and
(k) discharging the now eared tapered container from the ear-applying apparatus.

3. The method of making and stacking tapered containers in which the side walls and bottom of the containers are made of plastic with alike tapers adapted to nest within each other absent a locking engagement of the sides, the steps including:
(a) feeding from a storage reel a strip of plastic;
(b) laterally cutting the material of the strip and in a precise sequenced spacing, the cutting being interrupted so as to leave at least one interstice for the retaining together of the strip for alignment and further transport spacing;
(c) forming the strip into a longitudinal tube and with the longitudinal edges overlapped;
(d) advancing the formed tube over a mandrel;
(e) pressing and joining the lapped longitudinal edges as by heat sealing;
(f) separating into tubular sections the longitudinal tube by discontinuing the interstices at the lateral cut;
(g) tapering the tubular section under the influence of heat by expanding an inserted expandable male plug to stretch the side wall so as to form a determined taper;
(h) forming a safe top edge on the larger end of the tapered tubular section as by rolling;
(i) attaching a bottom to the smaller end of the tapered tubular section;
(j) advancing into an orienting means the tapered container;
(k) stacking in a nested array the tapered containers by inserting the small end of one container into the larger end of a like-sized container;
(l) assembling the stacked containers in a nested array;
(m) shipping the nested stacks to a separating means;
(n) feeding the stacks as single stacks to a separating operation;
(o) separating the containers in each stack so that the tapered containers are deposited one-by-one in spaced array upon a transporting means;
(p) transporting and advancing a tapered container to an ear-applying apparatus;
(q) attaching a pair of ball-end receiving ears on each tapered container, the ears diametrically disposed on the side of the container and a determined distance from the open end of the container, and
(r) discharging the now eared tapered container from the ear-applying apparatus.

References Cited

UNITED STATES PATENTS

| | | | |
|---|---|---|---|
| 2,456,506 | 12/1948 | Henchert | 113—120 |
| 2,486,832 | 11/1949 | Ferguson | 93—93 |
| 2,736,149 | 2/1956 | Earp | 53—26 |
| 3,228,272 | 1/1966 | Cvacho | 93—94 X |
| 3,343,465 | 9/1967 | Albert | 93—93 |
| 1,001,198 | 8/1911 | Haas | 93—36.7 X |
| 2,065,975 | 12/1936 | Meyer-Jagenberg | 93—93 |
| 3,124,872 | 3/1964 | Knodel | 29—413 |
| 3,199,421 | 8/1965 | Krause | 93—36.7 X |
| 3,233,072 | 2/1966 | Garver | 198—19 X |
| 3,272,094 | 9/1966 | Carpenter | 93—59 |
| 3,280,679 | 10/1966 | Huffman | 93—93 X |

FOREIGN PATENTS 296,421   5/1932   Italy.

WAYNE A. MORSE, Jr., *Primary Examiner.*

U.S. Cl. X.R.

53—147; 93—36.7, 93, 94; 113—1, 120